March 2, 1954
J. W. JEWELL
2,671,102
SEPARATION OF FINELY DIVIDED SOLIDS
FROM GASEOUS SUSPENSIONS THEREOF
Filed June 17, 1949
2 Sheets-Sheet 1
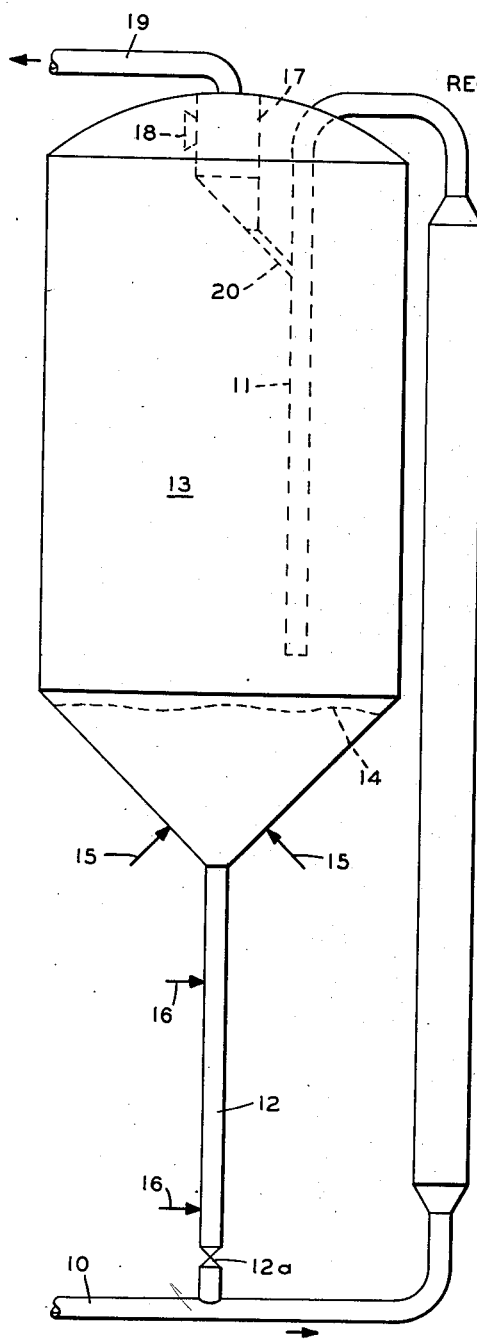
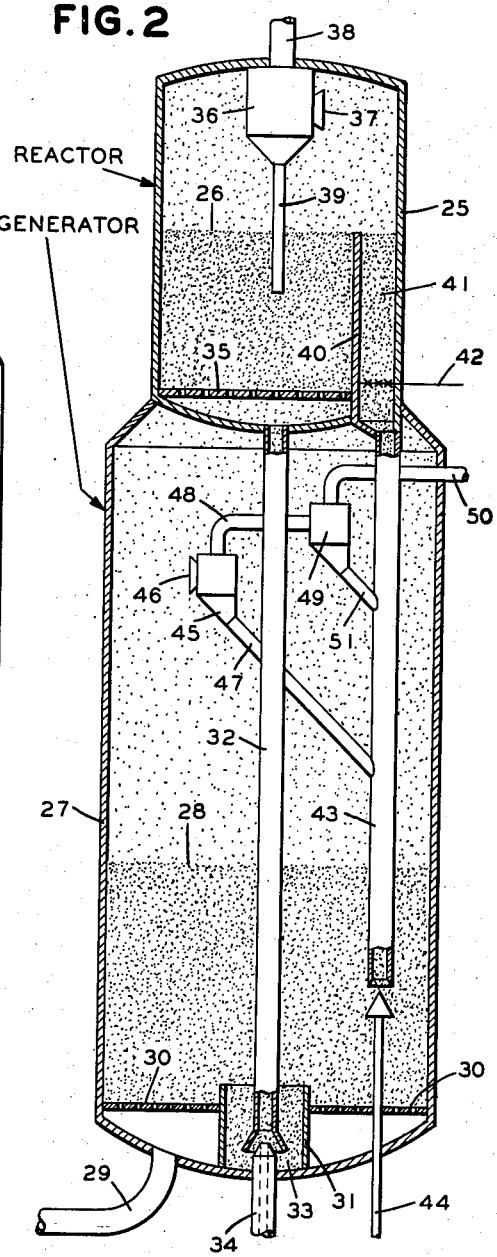
INVENTOR.
JOSEPH W. JEWELL
BY E. F. Liebrecht
G. W. Palmer
ATTORNEYS

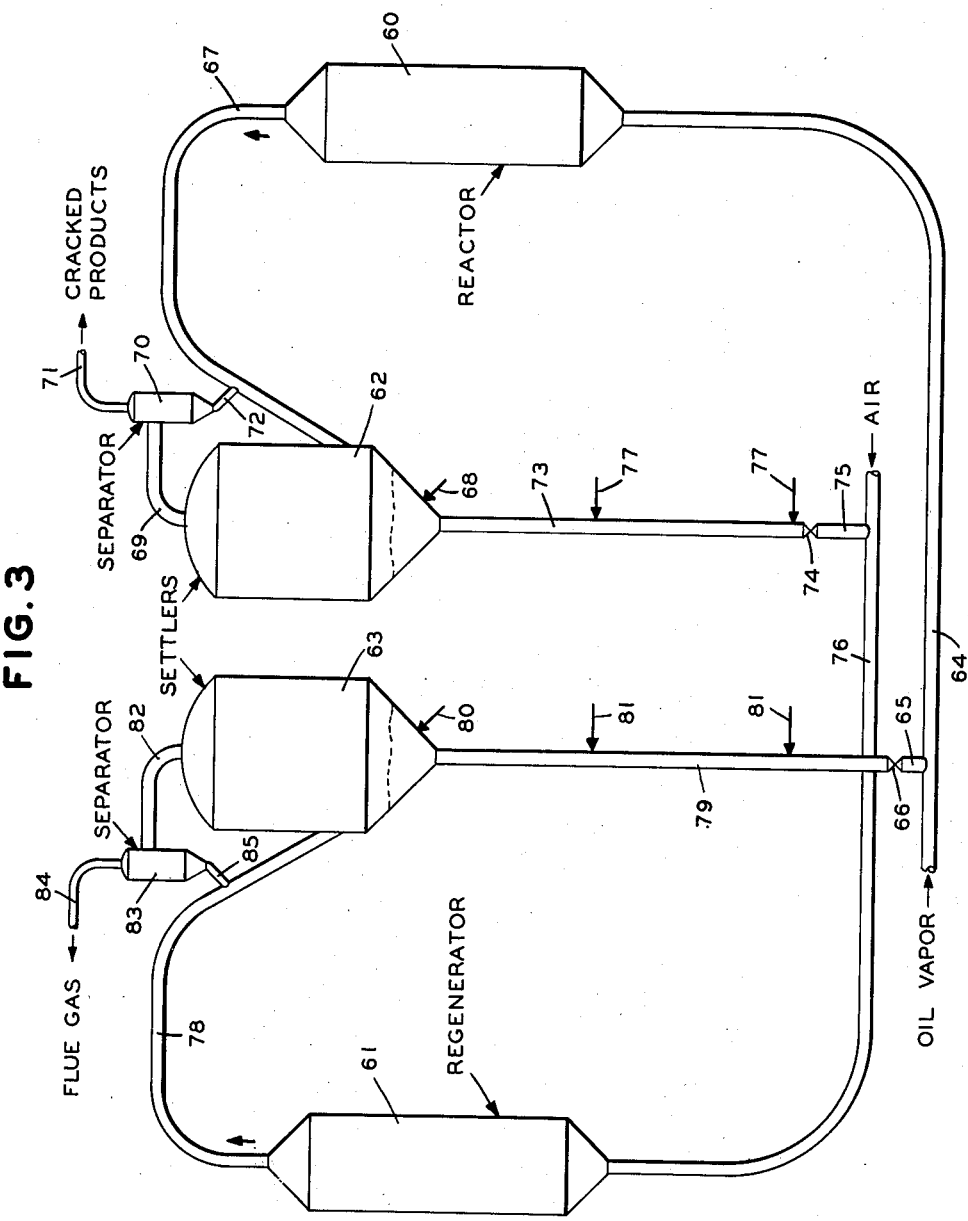

Patented Mar. 2, 1954

2,671,102

UNITED STATES PATENT OFFICE 2,671,102

SEPARATION OF FINELY DIVIDED SOLIDS FROM GASEOUS SUSPENSIONS THEREOF

Joseph W. Jewell, Summit, N. J., assignor to The M. W. Kellogg Company, Jersey City, N. J., a corporation of Delaware Application June 17, 1949, Serial No. 99,829

9 Claims. (Cl. 260—449.6)

This invention relates to improvements in handling finely divided solid material which is suspended in gas. In particular the invention relates to improvements in the separation of finely divided solids from gaseous suspensions thereof. More particularly the invention relates to improvements in methods for returning to a system of moving solids, finely divided solids separated from a gaseous suspension thereof flowing from the system. Such separation and return may occur during or after contact treatment of the gas and solid, wherefore the invention relates still more particularly to improvements in method and apparatus for contacting gas with finely divided solids, separating the solids and gas after such treatment, and returning the separated solids to the system. Such treatments include: heat exchange between the gas and the solid; catalytic reactions involving one or more gaseous reactants and finely divided solid material which may be a contact agent, catalyst, or reactant; thermal conversion treatment by hot finely divided solids; combustion of carbonaceous material on the surfaces of finely divided solids; and distillation of liquids contained in finely divided solids.

It is an object of this invention to provide an improved process of the character described above in which the separation of finely divided solids from suspension thereof in gas and the return of such separated solids to the system is effected in a manner which is simpler and more dependable than in prior processes. It is a further object of the invention to provide improved apparatus for handling finely divided solids suspended in gas.

The practice of the invention comprises continuously flowing finely divided solid material as an aerated mass downwardly as a stream in a substantially elongated confined path, as in a pipe or equivalent conduit. The aerated mass of solids may be a gaseous suspension or a relatively dense fluidized mass of the solid which moves down the elongated confined path at a relatively high linear velocity, or it may take the form of a relatively slowly moving fluidized mass in which at least a portion of the gas associated with the solids moves upwardly in the confined path. The suspension or fluidized mass is continuously discharged from the lower end of the elongated confined path into an enlarged zone in which the finely divided solid is permitted to settle by gravity against a gas flowing upwardly at a non-sustaining velocity.

The relatively high density of the suspension or fluidized mass flowing down the elongated confined path, in relation to the density of the gas, causes the pressure in the elongated path to increase in the downward direction to a maximum at the discharge point. The increase in pressure on the aerated mass flowing downwardly in the confined path per unit of vertical distance travelled is affected by the density of the aerated mass and also by the friction of the aerated mass in the confined path. However, the limits on velocity which are imposed by the need for avoiding erosion of equipment restrict the operation of the process to stream velocities at which the loss of pressure caused by friction is quite small. While a very low concentration of solids in the downflowing aerated mass is sufficient to over-balance the friction-loss, other considerations impose on the process a practical minimum concentration of solids in the aerated mass of 0.1 to 1.0 pound per cubic foot. Therefore, the loss of pressure, due to friction, in the downflowing aerated mass is so small, in relation to the pressure increase due to density, that the frictional loss may be substantially neglected in most applications of the invention.

Solids which are discharged from the confined path into the enlarged zone may be accumulated therein as a relatively dense mass which may be maintained in a fluid-like condition by suitable aeration. The upper level of the mass of accumulated solids may lie below the lower end of the confined path or may extend to a higher level whereby the conduit forming the confined path extends downwardly into the mass of accumulated solids.

Gas which is introduced into the enlarged zone, from the confined path, as a component of the aerated mass or from a separate source, flows upwardly outside the vertical confined path at a linear velocity which is limited to restrict the concentration of solids in the upflowing gas, at points above the upper level of any mass of accumulated solids in the enlarged zone, to a figure lower than the concentration of solids in the confined path. Under these conditions the decrease in pressure experienced in this relatively dilute suspension flowing upwardly, from the discharge point of the confined path or from the upper level of the mass of accumulated solids, is relatively small, per unit of vertical distance traveled, in comparison with the increase in pressure experienced by the aerated mass in flowing down the confined path.

Normally the concentration of solids in upflowing dilute suspension is less than 0.1 pound per cubic foot, and in most applications of the invention this concentration is so low that the decrease in pressure experienced by the dilute suspension as it flows upwardly outside the confined path, under limited gravity settling conditions, is so small that it may be substantially neglected. Therefore, the difference in pressure at any given level between a point inside the confined path and a point outside the confined path in open communication with the discharge point or with the upper surface of any mass of accumulated solids in the enlarged zone, may be considered to be substantially equal to the pressure differential in the column of the aerated mass between that level and the discharge point of the confined path.

It will be understood that the density of the downflowing aerated mass in the confined path must always exceed the density of the dilute suspension flowing upwardly outside the confined path in order to main the required pressure differential between the interior and exterior of the confined path. This is controlled primarily by limiting the upward velocity of the dilute suspension to restrict the concentration of solids therein to the required low proportion of the total incoming solid.

The proportion of the total gas introduced into the enlarged zone which is discharged from the confined path as a component of the aerated mass may vary over the whole possible range, from an operation in which the aerated mass discharged into the enlarged zone comprises all the gas introduced into the enlarged zone to an operation in which the aerated mass is introduced into the enlarged zone as a relatively dense mass containing only enough gas to maintain it in a fluid-like condition and in which gas is introduced into the enlarged zone from a source other than the confined path. These extreme conditions are embodied in specific embodiments of the invention to be described below, but it will be understood that the invention includes numerous embodiments intermediate these extremes.

The relatively dilute suspension flowing upwardly outside the confined path from the discharge point of the confined path, or from the upper surface of any mass of accumulated solids in the enlarged zone, is passed into a separating zone for separation of at least a portion of the solids component of the suspension. The separating zone is separate from the enlarged zone and is necessarily at a lower pressure than the enlarged zone, since the dilute suspension flows from the enlarged zone into the separating zone through a restricted conduit or orifice. The separating zone may be a simple settling chamber in which the velocity of the suspension is further reduced to provide settling of solids. Preferably, however, the separating zone is provided with means for facilitating separation of solids, whereby it may comprise a filter chamber or a centrifugal, inertial or electrostatic separator.

The vessel providing the separating zone may be located inside or outside the vessel providing the enlarged zone. In either arrangement the vessel providing the separating zone is located in accordance with this invention at a level above the discharge end of the confined path or the level of any mass of accumulated solids in the enlarged zone.

In the separating zone separation of suspended solids from the gaseous suspension is effected by one or more of the various separating means listed above. The gas stream, whose solids content has been eliminated or substantially reduced, passes out of the separating zone.

The solids separated in the separating zone accumulate at a low point therein for return to the enlarged zone in accordance with the improved method of this invention. In the operation of the improved process the pressure on the gas stream flowing out of the separating zone may be controlled, whereby the pressure in the interior of the separating zone, in which the separated solids accumulate, is lower than the pressure in the enlarged zone only to the extent of the pressure drop experienced by the dilute suspension in flowing from the enlarged zone into the interior of the separating zone. Only a negligible pressure drop is experienced by the dilute suspension in flowing from the discharge point of the confined path, or from the surface of any mass of accumulated solids which rises to a level above the discharge point, to the entrance of the separating vessel. On the other hand there is a relatively greater pressure gradient within the confined path, whereby any point in the confined path above the discharge point and the level of accumulated catalyst in the enlarged zone is at a pressure lower than the pressure at a point outside the path at the same level, in the enlarged zone, or any point outside the confined path in open communication with the enlarged zone in that gas may flow to such point from the enlarged zone without appreciable drop in pressure. This differential depends only in degree on the density in the confined path. Consequently it is possible to design the process, and apparatus therefor, to provide a confined path of sufficient length and having a sufficient density of solids therein whereby there is an elevated point in the confined path at which the pressure is substantially lower than the pressure on the dilute suspension flowing to the entrance of the separating vessel. The design may provide a pressure gradient in the confined path sufficient to provide a point therein at which the pressure is lower than the pressure in the interior of the separating zone. To obtain the latter condition it is necessary only to design the process and apparatus to provide an increase in pressure between the elevated point and the discharge point (or the level of the mass of the accumulated catalyst), which is numerically greater than the drop in pressure experienced by the dilute suspension in flowing from the enlarged zone into the interior of the separating zone.

In accordance with this invention the return to the enlarged zone of solids separated in the separating zone is readily and efficiently carried out by providing a suitable connection between the low point in the separating zone at which the solids accumulate and a point in the confined path. In certain modifications of the invention the connection with the confined path preferably is made at a point at which the pressure is lower than the pressure in the interior of the separating zone. This connection may be a suitable conduit or may be a simple orifice if the conduit providing the confined path and the vessel providing the separating zone have a common wall. In the arrangement in which the point of entrance into the confined path of accumulated solids from the separating zone is at a lower pressure than the interior of the separating zone, there is a pressure head available to assist the discharge of solids and there is a tendency for sufficient gas to flow with the separated solids to promote satisfactory flow of solids under conditions wherein gravity flow would not be feasible. It may be desirable to supply gas from an external source to the solids leaving the separating zone for transfer into the confined path. For example it may be desirable to supply an inert gas to prevent passage of reaction product gas into the confined path. For this purpose the conduit for transferring solids from the separating zone to the confined path may be constricted, to impose a slight pressure drop, and the inert gas may be introduced into the conduit between the constriction and the confined path.

This method differs materially from prior methods of returning solids thus separated, in that in the prior methods the solids are discharged from the separator directly into the zone of origin of the gas flowing through the separator and to a point at which the pressure is at least as high as at the entrance to the separator. In such prior methods the solids from the separating zone are passed downwardly through an elongated conduit which acts as a standpipe to overcome the pressure differential. This may present a serious operating problem, particularly if the solids are difficult to maintain in a flowable condition throughout an elongated standpipe. On the other hand the improved process of this invention provides satisfactory flow of solids from the separating zone even when handling solid material which is difficult to maintain in an aerated condition. In accordance with this invention the pressure increase to be overcome in returning separated solids may be reduced or converted to a pressure decrease.

In the preferred embodiment of the invention, in which the solids are returned to the elongated path at a point at which the pressure is lower than that in the separator, there may be substantial back flow of gas with the catalyst. The rate of flow of gas with the separated solids from the separating zone to the confined path is self-adjusting to some extent, although this is affected by the presence or absence of a controlling restriction in the conduit. If there is an increase in the flow of gas from the separating zone to the confined path there is a decrease in the density in the confined path below the point of connection. This causes the pressure at the point of connection to increase whereby the difference in pressure between the point of connection and the interior of the separating zone is decreased, thus decreasing the rate of flow of gas from the separating zone to the confined path. On the other hand if the rate of flow of gas from the separating zone is decreased the pressure at the connection in the confined path decreases, resulting in greater difference in pressure between the interior of the separating zone and the point of connection in the confined path. It is necessary only to operate the process under conditions such that the pressure increase experienced by the aerated mass in flowing down the confined path from the point of connection to the interior of the enlarged zone is greater than the pressure drop experienced by the dilute suspension in flowing from the enlarged zone to the interior of the separating zone.

In accordance with one modification of the invention, finely divided solid catalyst and gaseous reactants are intimately mixed and flow downwardly through a confined path, in a suitable conduit to a discharge point in an enlarged settling chamber. In the settling chamber the greater part of the catalyst is separated by settling and withdrawn therefrom at a low point. The gas stream containing suspended catalyst, in a concentration substantially lower than the catalyst concentration in the confined path, and including reaction product, is passed upwardly and into a separating zone such as a cyclone separator. The catalyst separated in the cyclone separator is discharged directly into the confined path at a point therein at which the pressure is lower than the pressure in the settling zone. This is the modification which is illustrated in Fig. 1 of the accompanying drawings.

In accordance with another modification of the invention finely divided catalyst passes downwardly through the confined path as a relatively dense fluidized mass. The fluidized catalyst is discharged from the conduit providing the confined path, which in this modification is in effect a standpipe, into an enlarged reaction zone. The gas reactant is charged independently into the reaction zone into contact with the catalyst to effect the catalytic reaction. In this operation the gas reactant may be passed into the bottom of the reaction zone and upwardly therethrough at a velocity effective to maintain the catalyst accumulated in the lower portion of the reaction zone as a relatively dense fluidized mass. The gaseous reactant and reaction product are passed from a point above the level of accumulated catalyst into a separating chamber from which separated catalyst is passed to the standpipe at a point which may be at a pressure below that of the separating zone but in any case, is appreciably below that of the enlarged zone. This is the modification illustrated by Fig. 2 of the accompanying drawings.

Fig. 3 of the accompanying drawings illustrates a modification of the invention in which catalyst is circulated continuously between reaction and regeneration zones and the finely divided catalyst is separated from both the reaction product gases and the regeneration gas in accordance with the improved method of this invention.

In the further description of the invention, with reference to the embodiments illustrated in the accompanying drawings, reference is made to carrying out catalytic reactions. It will be understood, however, that while the invention is particularly useful in carrying out catalytic reactions, it is applicable to various non-catalytic operation in which finely divided solids are contacted with gases or vapors.

In the description of the invention and in the claims the term "gas" is employed to designate the gasiform fluid with which the solids are contacted and from which they are separated. The "gas" may be a single normally gaseous compound or a mixture of such compounds. It may be a single vaporized normally liquid compound or a mixture of such compounds, or a mixture of one or more normally gaseous compounds with one or more normally liquid compounds.

Figs. 1, 2 and 3 are diagrammatic representations, in elevation, of arrangements of apparatus suitable for carrying out various modifications of the invention.

The embodiment of the invention illustrated by Fig. 1 will be described with particular reference to the use of such embodiment in carrying out the reaction of carbon monoxide and hydrogen to produce normally liquid hydrocarbons and oxygenated compounds. The reaction mixture comprising hydrogen and carbon monoxide is supplied from a suitable source into the lower end of conduit 10. Finely divided solid catalyst is discharged into the gas stream flowing through conduit 10 from standpipe 12 provided with control valve 12a. The resulting mixture flows upwardly in conduit 10 which is in effect a reaction zone, the catalyst and/or reactants being supplied at a temperature sufficiently high to initiate the desired reaction. Any of the known catalysts for the reaction may be employed, such as finely divided sintered iron promoted with alkali.

In conduit 10 the catalyst and reactants are contacted under conditions effective to produce the desired reaction. Preferably the catalyst and reactants are mixed at the discharge end of standpipe 12 at the rate of 4 to 12 pounds of catalyst per cubic foot of reactants which are supplied through conduit 10 at a suitable reaction temperature and pressure. Preferably a substantial portion of the vertical portion of conduit 10 is enlarged in cross-section, in order to permit in the lower, or horizontal, portion of conduit 10 a gas velocity effective to transport the catalyst horizontally and permit in the vertical portion a gas velocity which permits catalyst slippage to the extent necessary to maintain the desired catalyst density therein. Temperature control means, in this case cooling means, may be associated with the enlarged vertical portion of conduit 10. The suspension is passed upwardly through the enlarged portion of conduit 10 at a flow rate which is initially 2 to 10 feet per second, although this may be increased temporarily in passing through cooling means. This flow rate decreases as the suspension proceeds through conduit 10, as the volume of the gas contracts as the reaction proceeds. The velocity is selected to produce in the upflow portion of conduit 10 a catalyst density of approximately 10 to 55 pounds per cubic foot. The suspension flows from conduit 10 into a downflow-conduit 11 which is a downward extension of conduit 10 and provides the confined path for downward flow of the aerated mass of solids as heretofore described. The suspension flows downwardly in conduit 11 at any desired gas velocity which may be approximately the same gas velocity as in conduit 10 but the catalyst density in the downflow section is substantially lower, being approximately the same as the feed density corrected for changes in gas volume.

The suspension discharges from the lower end of conduit 11 inside settling chamber 13. As indicated in Fig. 1, the downflow conduit 11 may be located substantially entirely within chamber 13 and preferably extends to a point near the bottom of the chamber. Chamber 13 is substantially enlarged in relation to the diameter of conduit 11 whereby substantial separation of catalyst and gaseous reaction products occurs within chamber 13 as the result of the initial downward movement of the incoming solids and gravity settling. The settled catalyst is maintained as an aerated mass in the bottom of chamber 13 having a level indicated diagrammatically at 14. To maintain the separated catalyst in an aerated condition, and in order to strip reaction products therefrom, an aerating and stripping fluid, such as steam or a gas consisting largely of hydrogen or carbon dioxide, may be introduced into the bottom of chamber 13, at 15. A standpipe 12, provided with a control valve 12a, is connected to the bottom of chamber 13 whereby the catalyst separated in chamber 13 is permitted to flow out of the chamber through standpipe 12 for reuse in the reaction. Standpipe 12 is sufficiently elongated to provide an increase in the static pressure of the aerated catalyst flowing through the standpipe to balance the drop in pressure of the suspension flowing from the base of standpipe 12 through valve 12a and conduit 10 to the discharge end of conduit 11. Additional aerating gas such as steam or hydrogen may be introduced at suitable points in standpipe 12, as indicated at 16, to assist in maintaining the desired aerated condition of the catalyst flowing downwardly through standpipe 12.

While the greater part of the catalyst introduced into chamber 13 from conduit 11 is separated by gravity in chamber 13 and withdrawn through standpipe 12 a substantial portion of the catalyst is carried upwardly in relatively dilute suspension in the rising gas stream in chamber 13 and must be separated therefrom by other means. Such separating means are exemplified in Fig. 1 by the provision in chamber 13 of a single cyclone separator 17. One cyclone separator only is shown, although it is to be understood that a plurality of such separators may be employed, and that such a plurality of separators may be arranged either inside or outside chamber 13, or partially inside and partially outside the chamber, and may be arranged either in parallel or in series, in relation to the gas flow.

In the arrangement shown in Fig. 1 the gas stream flows out of the settling zone in chamber 13 and through the orifice 18 of cyclone 17. In cyclone 17 the suspended solids, or at least a portion of them, are separated from the gas stream by centrifugal force and are precipitated to the bottom of cyclone 17. The gas stream passes out of cyclone 17 through line 19 for further treatment, or disposal, elsewhere.

The lower portion of cyclone separator 17 is connected, by a conduit 20, with conduit 11 at a point at which the pressure is slightly lower than the pressure in the interior of the cyclone. Conduit 20 is connected to conduit 11 at a distance above the discharge end of conduit 11 which is sufficiently great to provide an increase of pressure between the junction of conduit 20 with conduit 11 and the discharge end of conduit 11 which is numerically greater than the loss of pressure of the gas stream flowing into cyclone separator 17. The drop in pressure on the gas stream flowing for the interior of chamber 13 into cyclone 17 ordinarily is substantially less than 0.5 pound per square inch. If the density in conduit 11 is approximately 10 pounds per cubic foot the pressure therein at a point 15 feet above the discharge point is approximately 1 pound per square inch lower than the pressure in the interior of chamber 13, or at least 0.5 pound per square inch lower than the pressure in cyclone. In this modification the velocity of the suspension flowing upwardly in chamber 13 is relatively low whereby the suspension is so dilute that any decrease in pressure experienced by the suspension in flowing from conduit 11 to orifice 18 is negligible. A connection of conduit 20 with conduit 11 at a point 15 feet above the discharge point, therefore, provides for continuous and unimpeded transfer, from cyclone 17 to conduit 11, of the catalyst separated from the outgoing vapors in cyclone 17. This provides for return of the separated catalyst to chamber 13 without the need for aerated diplegs as in previous arrangements of such apparatus. This operation is particularly advantageous in the reaction of carbon monoxide and hydrogen in the presence of the powdered iron catalyst as the catalyst separated in this reaction is, under some desired operating conditions, difficult to maintain in a flowable condition in the usual diplegs.

The embodiment of the invention illustrated in Fig. 2 will be described with particular reference to the catalytic conversion of hydrocarbons, such as the cracking of hydrocarbon oil or the reforming of naphtha. In the apparatus shown diagrammatically in Fig. 2, two contact vessels are arranged in a unitary structure. The upper vessel, chamber 25, provides the conversion zone in which hydrocarbon vapors are contacted with a dense fluidized mass of finely divided, or powdered, catalyst which is maintained in that condition by the passage of the hydrocarbon vapors therethrough. The upper level of the fluidized mass of catalyst is indicated at 26. The lower vessel, chamber 27, provides the regeneration zone in which a similar dense fluidized mass of catalyst having an upper layer at 28 is contacted with an upflowing stream of regenerating gas, such as air. The air stream is supplied at a low point in chamber 27 from conduit 29 and passes upwardly into the catalyst mass through perforated distribution plate 30 which supports the catalyst mass. A circular weir 31 is provided in the bottom of chamber 27 to form a well into which a portion of the catalyst undergoing regeneration continuously flows by gravity from the dense fluidized mass. A vertical conduit 32 extends from the bottom of vessel 25 to a low point in the well 33 formed by weir 31. Hydrocarbon vapors, such as gas oil vapors, are introduced into the bottom of well 33, and conduit 32, by means of conduit 34. Conduit 34 forms the stem of a plug-type valve, the seat for which is provided by the lower end of conduit 32. Vertical movement of the valve stem varies the size of the opening between well 33 and conduit 32, thus providing control of the rate of flow of catalyst from regenerator to reactor. By a suitable control of the relative pressures in chambers 25 and 27, above the dense phase in each, by controlling relative heights and relative densities of the masses of catalyst in chambers 25 and 27, the static pressure in the bottom of well 33 is maintained higher than the pressure necessary to force the vapor stream upwardly in conduit 32 and upwardly through the dense mass of catalyst in chamber 25. Under these conditions catalyst flows out of the dense mass undergoing regeneration in chamber 27 into well 33 and into the lower end of conduit 32 whereby it is suspended in the upflowing gas stream and carried upwardly into chamber 25 in suspension in the hydrocarbon vapors. The regenerated catalyst flowing into well 33 may be aerated by means of additional aerating gas, if necessary, supplied by any suitable means.

The suspension of hydrocarbon vapors and regenerated catalyst flows upwardly through conduit 32 and passes into the lower portion of chamber 25 through perforated distribution plate 35 which supports the dense fluidized catalyst mass. The regenerating gases flowing upwardly through the mass of catalyst in chamber 27 and the hydrocarbon vapors flowing through the mass of catalyst in chamber 25 are given an upward velocity within the range of approximately 0.5 to 6 feet per second whereby the catalyst masses are maintained in the desired relatively dense pseudo-liquid condition.

In passing upwardly through conduit 32 and in passing through the fluidized mass of catalyst in vessel 25 the hydrocarbon vapors undergo conversion to compounds of different composition with accompanying deposition of carbon on the catalyst particles. The vaporous reaction products pass out of the dense mass of catalyst at the upper level thereof at 26 and are then treated to separate entrained catalyst. Any suitable means may be employed for this purpose and in order to illustrate such a separation a cyclone separator 36 is provided in the top of vessel 25. The vapors pass into cyclone 36 through orifice 37 and the catalyst-free vapors are then withdrawn for further treatment through conduit 38. The catalyst separated in cyclone 36 collects in the bottom thereof and is returned to the dense bed of catalyst through dipleg 39 which extends downwardly into the dense bed of catalyst. The catalyst flowing down through dipleg 39 is maintained in an aerated condition and this may require the injection of an aerating gas, such as steam, by any suitable means, which are omitted from the drawing.

The continuous supply of regenerated catalyst to chamber 25 with the hydrocarbon vapors maintains the level of the dense phase of catalyst in chamber 25 at a height whereby there is continuous overflow of catalyst over a suitable weir 40 into an adjacent stripping zone 41. A suitable stripping gas, such as steam, is continuously introduced at 42 into the bottom of stripping zone 41 to strip hydrocarbon vapors from the catalyst therein. From the bottom of stripping zone 41 a standpipe 43 extends downwardly in chamber 27 to a relatively low point, preferably below the upper level 28 of the fluidized mass of catalyst therein. A plug valve 44 is provided to permit fixing the size of the opening in the bottom of standpipe 43 in accordance with the requirements of the operation. The catalyst collected in stripping zone 41, which is maintained in a fluidized condition by the stripping gas and preferably is maintained in a substantially more dense condition than the catalyst in the conversion zone, flows downwardly through standpipe 43 at a rate governed by the size of the opening in the bottom of the standpipe 43. Standpipe 43 is sufficiently long to provide a substantial increase in the static pressure on the catalyst during its flow through the standpipe whereby the pressure at the bottom of the standpipe is greater than the pressure in the surrounding portion of chamber 27. The catalyst flowing downwardly through standpipe 43 is maintained in an aerated condition and this may require supplying additional aerating gas, such as steam, at various points along the length thereof, by means which are omitted from the drawing.

The regenerating gas, such as air, is distributed over the bottom of the fluidized mass of catalyst in chamber 27 by means of distribution plate 30. The air is passed upwardly through the catalyst mass at a suitable linear velocity, for example 0.5 to 6 feet per second, in order to maintain the catalyst as a relatively dense pseudo-liquid mass having an upper level at 28. The spent regeneration gas emerges from the upper surface of the catalyst mass and flows upwardly to an upper exit. Vessel 27 is sufficiently high to provide for a substantial space above the upper surface 28 of the catalyst mass to facilitate separation and settling of catalyst particles in the upper portion, or diffuse phase, of the regeneration zone.

The spent regeneration gas is withdrawn from vessel 27 at a high point by passing it into a cyclone separator 45, through orifice 46. In cyclone 45 catalyst particles suspended in the regenerating gas, or at least a portion of them, are separated from the gas stream in the well known manner and are precipitated to the bottom of cyclone 45.

The lower portion of cyclone 45 is connected to standpipe 43, by a conduit 47, at a point in standpipe 43 at which the pressure is lower than the pressure in the interior of vessel 27. It may be preferable to connect conduit 47 to standpipe 43 at a distance above its lower end which is sufficiently great to provide an increase of pressure in standpipe 43 below conduit 47 which is slightly greater than the drop of pressure experienced by the regenerating gas in flowing into the interior of cyclone 45.

The spent regeneration gas from which catalyst has been precipitated in cyclone 45 is withdrawn therefrom through conduit 48, through which the gas may be discharged to a stack or may be passed to additional means for separation of suspended catalyst located either inside or outside vessel 27 and from which separated catalyst may or may not be discharged into standpipe 43. In the modification of the invention illustrated in Fig. 2, a second cyclone 49 is provided and conduit 48 is connected to cyclone 49 in order to pass the regeneration gas in series through cyclones 45 and 49 to remove successive increments of the suspended catalyst from the gas. The regeneration gas from which an additional quantity of catalyst has been separated in cyclone 49 is withdrawn therefrom through line 50, through which it is transferred for further handling as desired.

The catalyst separated from the gas passing through cyclone 49 is collected from the lower portion thereof and withdrawn through conduit 51, which connects with standpipe 43 in order to effect return of the catalyst to vessel 27, in the same manner as described in connection with cyclone 45 and conduit 47. Conduit 51 is connected to conduit 43 at a point substantially above the point of connection of conduit 47 with standpipe 43, so that the difference in pressure between these points is at least as great as the pressure drop experienced by the regeneration gas in passing from the interior of cyclone 45 to the interior of cyclone 49.

The exact location of the connections of conduits 47 and 51 with standpipe 43 when transferring the separated catalyst to points of lower pressure in standpipe 43, depends upon the kind of catalyst employed in the operation, the density of the catalyst mass inside the standpipe 43 and in the fluidized mass of catalyst in vessel 27, the depth to which standpipe 43 extends into the catalyst bed, and the pressure differential which is maintained at the exit of standpipe 43. When a cracking catalyst of the silica-alumina type is employed it may be transferred through standpipe 43 under aerating conditions therein which result in a density of the order of magnitude of 30 pounds per cubic foot, and the degree of aeration of the fluidized mass of catalyst in vessel 27 may result in a substantially lower density, for example approximately 15 pounds per cubic foot. Under these conditions, and when the standpipe 43 extends into the dense phase for a distance of approximately 10 feet below level 28, with a pressure differential of approximately 3 pounds per square inch at the exit of the standpipe, it will be found that the pressure in standpipe 43 at a point about 12 feet above level 28 is approximately 0.5 pound per square inch lower than the pressure in the diffuse phase in vessel 27. A connection of conduit 47 with standpipe 43 at that point provides flow of catalyst from cyclone 45 to a point of lower pressure in standpipe 43, since the pressure drop experienced by the gas stream in flowing into the interior of cyclone 45 is less than 0.5 pound per square inch.

It will be evident that if it is desired to provide a greater pressure differential between the diffuse phase and the point of connection on conduit 47 with standpipe 43, or if it is desired to maintain a greater pressure differential at the exit of standpipe 43, it will be necessary to connect conduit 47 with standpipe 43 at a point more distant from the lower end of standpipe 43 to locate a point at which the pressure is lower than in cyclone 45. The same considerations apply in locating the point of connection of conduit 51 with standpipe 43. The distance of this point from the point of connection of conduit 47 with standpipe 43 depends upon the pressure drop experienced by the gas in flowing from cyclone 45 to cyclone 49. Ordinarily this pressure drop is less than 1 pound per square inch, so that a suitable point for connecting conduit 51 with standpipe 43 is less than 5 feet above the point of connection of conduit 47 with standpipe 43.

In the modification illustrated in Fig. 2 and described above it is important to operate the unit with minimum adjustment of valve 44, to avoid fluctuations of pressure in the standpipe 43. Furthermore, it is desirable to connect conduits 47 and 51 with standpipe 43 at points at which the pressures are lower than the pressures in the cyclones by the smallest differential effective for satisfactory flow of catalyst through the conduits. This restricts to a minimum the flow of gas through the conduits into the standpipe. Excessive or varying flow of gas into the standpipe would interfere with its operation. It may be desirable to connect conduits 47 and 51 to points in standpipe 43 at which the pressures are equal to or a little higher than the pressures in cyclones 45 and 49. In this arrangement conduits 47 and 51 are designed to operate as low pressure head standpipes, generating any slight pressure head necessary to cause catalyst flow from the cyclones to standpipe 43. The low pressure head required and the flowing stream in conduit 43 at the outlets of conduits 47 and 51 make the operation much more reliable than that of a long dipleg extending below the level in the fluid bed.

The modification illustrated by Fig. 3 may be used in any contact process in which catalyst or contact agent is circulated continuously between two zones in which it is subjected to different conditions. To illustrate the operation of this modification reference is made to catalytic conversion treatment, such as hydrocarbon oil cracking or reforming in which the oil is treated with a catalyst in a reactor and the catalyst is circulated continuously through the reactor and a regenerator in which it is contacted with air or other suitable regenerating fluid to burn off carbonaceous deposits acquired by the catalyst in the reaction zone. For convenience of description of Fig. 3 reference is made to catalytic cracking of gas oil to form gasoline, but it will be understood that the principles of operation illustrated are applicable to other catalytic or contact treatments.

For carrying out the modification of the invention illustrated by Fig. 3 there are provided a reactor 60, a regenerator 61, a settler 62 for effective initial separation of spent catalyst and reaction products, and a settler 63 for separating regenerated catalyst from flue gas. Reactor 60 and regenerator 61 are upflow contact vessels in which the catalysts and reactants or regeneration gas are introduced at the bottom and withdrawn overhead. Each vessel is enlarged in cross-section to provide for a gas velocity which permits the accumulation of catalyst in the contact zone to permit a longer residence time of catalyst than reactants or regenerating gas in the contact zones.

In the operation of the process of Fig. 3 hydrocarbon oil vapors are introduced into the process through transfer line 64 which connects with the bottom of reactor 60. Active or regenerated catalyst is introduced into line 64 from line 65 through valve 66 at the rate necessary to promote the reaction to the desired extent. The resulting suspension of vapors and catalyst is discharged upwardly into reactor 60 in which the vapor velocity is substantially reduced as a result of the enlargement of the path of flow. The vapor velocity which is provided for in reactor 60 by the design of the apparatus depends on the concentration of catalyst desired in the reaction zone and the residence time desired for the catalyst in the reaction zone. It may be desired to maintain a relatively great concentration of catalyst in the reaction zone whereby the apparatus is designed to provide an initial vapor velocity in reactor 60 in the range of 0.2 to 6.0 feet per second. Under these conditions the catalyst accumulates in reactor 60 as a relatively dense fluidized bed having a bed level whose distance from the exit of reactor 60 depends upon the vapor velocity and the particle size of the catalyst employed. Alternately the vapors may be passed through reactor 60 at a higher velocity to provide for accumulation of catalyst therein by mere "slippage."

Cracked products and entrained catalyst are withdrawn as a suspension through conduit 67 which extends from the top of reactor 60 and is turned downwardly to discharge in a downward direction into settler 62 the suspension of cracked products and cracking catalyst. The down turned portion of conduit 67 is arranged to provide the vertically elongated confined path exemplified in Fig. 1 by conduit 11 and in Fig. 2 by standpipe 43. Conduit 67 may terminate at the wall of settler 62 but preferably may extend into the settler for a substantial distance.

In settler 62 the suspended catalyst is largely separated from the cracked products by settling and accumulates in the bottom of settler 62. Preferably settled catalyst is maintained in an aerated condition to facilitate its withdrawal from settler 62 and this may be assisted by suitable introduction of aerated gas, such as steam, into the bottom of settler 62 at the point 68.

While settler 62 is substantially enlarged in cross-section to promote efficient settling of the suspended catalyst, it is found that by discharging the suspension into the settler in a downward direction the efficiency of the settler is greatly increased whereby it can be designed with substantially less height and/or diameter than would be required with upward discharge of the suspension into the settler. Differently stated, entrainment of solids in the vapors flowing upwardly in settler 62 is substantially less than in operations in which the same gas is passed upwardly in a chamber of the same dimensions after being bubbled through a fluidized bed of solids.

The cracked products are withdrawn overhead from settler 62 through line 69 which discharges them into a separator 70 which may be one or more centrifugal separators, arranged in any desired manner, to effect further separation of suspended catalyst from the cracked products. The cracked products are then withdrawn from separator 70 through line 71 and further handled in the known manner. The separated catalyst accumulates in the bottom of separator 70 and is withdrawn therefrom through conduit 72 which is connected to conduit 67 to effect return of the separated catalyst into settler 62. The principles of operation illustrated by the connection of conduit 72 to conduit 67 are the same as those described above in connection with the operations of conduit 11 and standpipe 3. From the previous discussion of the improved process of the invention it will be understood than any point in the downward path of flow of the suspension flowing through conduit 67 will be at a lower pressure than the pressure inside settler 62, whereby the return of catalyst in this manner is much easier than when directly discharging the catalyst from the separator directly into the settling zone. In operations of the type illustrated in Fig. 3, in which the density in conduit 67 is lower than of the usual standpipe and in which there is no valve at the discharge end, it is preferable to connect conduit 72 to conduit 67 at a point of lower pressure. However, in operations employing catalyst which is not difficult to maintain in a fluidized condition it may be satisfactory to connect conduit 62 with conduit 67 at a point at which the pressure is merely equal to, or higher than, the pressure on the separated catalyst in separator 70. The principles involved in selecting a point of connection of conduit 72 with conduit 67 are the same as those described in connection with Figs. 1 and 2 and need not be repeated here. In either case normal changes in operating conditions will not change the pressure drop in the system sufficiently to affect the flow of recovered material. As pointed out above, the system is self-adjusting to some extent.

The settled catalyst maintained in a relatively flowable condition in the bottom of settler 62 may be withdrawn therefrom through a suitable standpipe 73 which connects with valve 74 from which the catalyst is transmitted through line 75 into an air line 76 which connects with the bottom of regenerator 61 for discharging into that vessel the resulting suspension of spent catalyst and regenerating gas. Standpipe 73 may be of the conventional type and may be provided with means for introducing additional aerated gas, such as steam, at one or more points along the length of the standpipe, indicated in the drawing by the arrows 77. Standpipe 73 is provided to effect transfer of the spent catalyst from the pressure in settler 62 to the pressure maintained in air line 76, the latter being whatever pressure is required to flow the regenerating gas through line 76, regenerator 61 and other apparatus traversed by the flue gas.

The height at which it is necessary to elevate the settling vessel 62 above grade level is affected principally by the length of standpipe 73 which is required, this being affected in turn by the pressure conditions maintained in the process. The height at which it is required to elevate reactor vessel 60 above grade level is governed principally by the radius of the curve applied to transfer line 64 in turning from the horizontal to the vertical. In the upflow type of operation illustrated in Fig. 3 in which catalyst is withdrawn overhead with the gas or vapors, a substantially higher velocity is employed than in present "bottom draw-off" operations in which it is necessary to effect substantial settling of catalyst in the vessel providing the reaction zone.

It will be understood that standpipe 73 is provided merely as a means for transferring the catalyst from settler 62 to a point of higher pressure at the entrance of valve 74. The standpipe is necessary only if the pressure necessary at the entrance of valve 74 is higher than the pressure in settler 62. It will be understood furthermore that other means for effecting this transfer of catalyst may be employed; for example, instead of standpipe 73 the well-known Fuller-Kinyon pump may be employed (see U. S. Patents 1,553,539 and 2,102,330).

Fig. 3 illustrates a modification of the invention in which the elongated downward extending confined path, illustrated by the down turned portion of conduit 67, is largely outside the enlarged settling zone of vessel 62. Fig. 3 also illustrates the modification of the invention in which the separating zone of separator 70 is located outside the enlarged settling zone of vessel 62 and in which the separated catalyst is introduced into the downward confined path at a point outside the enlarged settling zone. It will be understood, however, that the function of settler 62 and its subsidiary pieces of apparatus could be carried out by apparatus similar to that illustrated in Fig. 1 in which the separator is located inside the settler and in which the downward confined path is substantially entirely located within the settler.

Fig. 3 also illustrates a modification of the invention in which the conduit providing the downward confined path of flow of the aerated mass of solids is at least in part inclined from the vertical. It will be understood of course that vertical flow of the aerated mass represents the ideal condition of operation in maintaining the catalyst in the aerated condition, particularly in handling relatively dense fluid masses of catalyst. However, the exigencies of construction of the apparatus may make desirable some departure from the vertical and this is permissible, particularly when transferring relatively dilute aerated masses of catalyst at relatively high velocity. The extent to which the downward path of flow is inclined from the vertical is affected only by the problem of maintaining the aerated condition of the mass of catalyst being transferred. It will be understood that in calculating the increase in pressure experienced by the aerated mass in flowing down a conduit which is inclined from the vertical only the vertical dimension may be considered. If that part of conduit 67, below conduit 72, is inclined 18° from the vertical a 10 foot length of conduit would descend a vertical distance of 9.5 feet, this being the length used in calculating the increase of pressure due to hydrostatic head in that length of conduit.

While the reaction zone of Fig. 3 is described as a once-through operation of the catalyst, it will be evident to those skilled in the art that a portion of the catalyst separated in settler 62 may be returned directly to reactor 60 without regeneration treatment. For this purpose a standpipe, similar to standpipe 73, or other catalyst transfer means, may be provided to transfer catalyst from the bottom of settler 62 to transfer line 64 or to a low point in reactor 60. The operation would be desirable particularly when passing reactants through reactor 60 at a relatively high velocity whereby the residence time of the catalyst is insufficient to reduce its activity to a level requiring regeneration. For simplicity of description of the invention the apparatus for this optional method of operation is omitted from the drawing.

All the air necessary for regeneration of the catalyst may be introduced into the process through line 76. Alternately a portion of the air may be introduced directly into regenerator 61, or all the air for generation may be introduced in that manner, an inert gas being employed instead of air in line 76 for transporting the spent catalyst to the regenerator. However, these are variations which are conventional in the "fluidized" catalytic cracking process and provision for them is omitted from the drawing. The spent catalyst is suspended in the air stream flowing through line 76 and is thus transported into the regenerator. The spent catalyst ordinarily is above the temperature of ignition of the carbonaceous deposits whereby combustion begins immediately on contact with the air and continues during the traveling of the suspension through line 76. If the quantity of catalyst undergoing regeneration is insufficient to absorb the heat of combustion of regeneration it is desirable to limit the residence time of the catalyst in line 76 to restrict the temperature rise experienced by the catalyst in line 76 within permissible limits. This may not be practicable and it is for this reason that it may be desirable to limit the amount of oxygen, as air, introduced into transfer line 76 while providing additional oxygen from separate sources.

The principles of operation of regenerator 61, as to catalyst density and gas velocity, are generally the same as those of reactor 60. As in the operation of reactor 60 the gas velocity in regenerator 61 may be relatively low, for example, 0.2 to 6.0 feet per second, to maintain a relatively dense fluidized mass of catalyst in the regenerator, or substantially higher velocity may be employed, for example, in the range of 6 to 25 feet per second to operate under conditions of lesser catalyst concentration in the contact zone.

In connection with both reactor 60 and regenerator 61 it may be understood that the catalyst concentration depends not only on the velocity of the gas and vapors in the enlarged vessel but also on the rate at which the catalyst is discharged into the transfer lines, this being limited by the carrying capacity of the vapor and gas streams, which in turn is effected by the velocity of such streams. Consequently, while the highest catalyst concentrations in the contact zones are most conveniently attained by employing relatively low gas velocity therein, the concentration of the catalyst in operations of relatively high velocity is limited only by the capacity of the gas or vapor stream to transport the catalyst in suspension.

If the heat of combustion generated in the regeneration zone is greater than the capacity of the catalyst to absorb heat while experiencing a temperature rise within the permissible limit during regeneration, it is necessary to provide means for withdrawing heat from the regeneration zone. For this purpose any of the well-known means may be employed, such as the provision of indirect cooling means in the regeneration zone, the injection of cooling fluids into the regeneration zone, and the circulation of a portion of the catalyst from the regeneration through external cooling means and back to the regeneration zone. However, since these are conventional operations apparatus for performing them is omitted from the drawing. On the other hand if the regeneration step, in a reaction other than petroleum cracking, requires the addition of heat it may be similarly effected by indirect circulation of a catalyst through a separate heating unit.

The regenerated catalyst and flue gas are transported from the top of regenerator 61 and discharged at a low point in settler 63 by means of conduit 78 which is designed to operate in accordance with the same principles as conduit 67. Settler 63 is similar in design and operation to settler 62, although not necessarily of the same size. The catalyst settled in settler 63 is transferred to valve 66 by means of a suitable standpipe 79, aerating means being provided at 80 and 81. The flue gas is withdrawn from the top of settler 63 through line 82 and discharged into separator 83 which may be similar in operation and construction to separator 70. The flue gas is discharged from separator 83 through line 84 for further handling of the known matter. The catalyst separated in separator 83 is discharged from the bottom thereof through conduit 85 which connects with conduit 78 in accordance with the principles employed in connecting conduit 72 with conduit 67.

The elevation of vessel 63 depends upon the length required of standpipe 79, in the manner described in connection with standpipe 73 and vessel 62 although standpipe 79 may be replaced by other suitable catalyst transfer means. Likewise the elevation required of regenerator 61 depends on the radius of curvature required in line 76 and the other factors described in connection with reactor 60. Likewise the arrangement of conduit 78, settler 63, separator 83 may be replaced by an arrangement similar to that illustrated in Fig. 1 in connection with conduit 11, vessel 13 and separator 17.

The conditions of temperature and pressure employed in the operation illustrated in Fig. 3 depend upon the kind of conversion being performed. For catalytic cracking of gas oil it may be desirable to operate reactor 60 at an outlet pressure of 9 lbs. per square inch with a similar pressure in settler 62, while operating regenerator 61 at an outlet pressure of about 7 lbs. per square inch with similar pressure in settler 63.

The system illustrated in Fig. 3 has several advantages over systems suggested previously for similar reactions. The capital investment required is lower because the larger pieces of equipment may be located at a lower overall height than in systems employing direct withdrawal of catalyst from the dense phase with internal cyclone separators or in systems employing upflow of catalyst to a superimposed settler with internal cyclone separators. A further advantage is the fact that the flow of gas with the catalyst in lines 72 and 85 permits the use of smaller lines than would be required for a static pressure dipleg. An important advantage of the system of Fig. 3 resides in the fact that no equipment is supported inside of the high temperature pressure vessels.

For effecting catalytic cracking in the operation illustrated in Figs. 2 and 3 the well-known silica alumina catalysts now employed commercially in catalytic cracking may be used. These are silica alumina complexes containing a major portion of silica and having particle sizes principally within the range of 1 to 100 microns. Alternately catalyst of similar composition but more uniform particle size may be employed such as the well-known "micro-sphere" catalyst.

In the modifications of the invention shown in Figs. 1, 2 and 3 the upward path of flow of the gas or vapors, after discharge of the aerated mass of catalyst from the downward path of flow, is largely inside the enlarged settling zone. In Figs. 1 and 2 the upward path of flow is entirely inside the settling zone, and this is true of Fig. 3 except for conduits 69 and 82. It will be understood however that the invention includes within its scope operations in which the upward path of flow lies principally outside the enlarged settling zone and in which the separator is elevated substantailly above the vessel comprising the enlarged settling zone. For example, the settling zone may be located substantially at grade level while the gases from the settler flow upwardly through an elongated conduit through separating means located at a substantial elevation.

In the modification illustrated in Figs. 1 and 3 the equipment is designed ordinarily to provide for maintaining the level of accumulated solids below the lower end of the down-flow conduit, in vessels 13, 62 and 63. In such an operation the pressure at all points in the down-flow conduit is lower than the pressure in the vessel outside the conduit. In such an operation, however, temporary alteration of conditions may cause a rise in the solids level in the vessel, whereby the lower portion of the conduit is submerged in, or lies below the level of, the bed of solids. This change may result in the pressure in the conduit at the point of solids return becoming higher than that in the vessel above the bed of solids. However, this need not render the process inoperable as the pressuring effect of the column of solids in the line transferring the separated solids to the conduit may be made sufficient to insure return of solids even under these extreme conditions, especially since the density of the returning solids is increased by the increased carryover of heavier particles which follows a rise in the bed level.

I claim:

1. A method for effecting a chemical reaction which comprises contacting a gaseous reactant with a finely divided solid catalyst, mixing the catalyst and gas comprising the reactant to form an aerated mass of catalyst, flowing an aerated mass of such solids downwardly in a single substantially elongated confined path, the density of the mixture being sufficiently great whereby the pressure in the confined path increases in the direction of flow, discharging the aerated mass from the single confined path into an enlarged disengaging zone sealed from the confined path except at the point of discharge, flowing upwardly in the enlarged zone and into a separating zone a gas stream carrying suspended catalyst in low concentration, separating catalyst from the gas stream in the separating zone, and passing the separated catalyst directly from the separating zone into the said elongated confined path at a point in the path at which the pressure is lower than the pressure under which separated catalyst would exist just before entering said path.

2. A method for effecting chemical reaction which comprises contacting a gaseous reactant with a finely divided solid catalyst, mixing the catalyst and gas comprising the reactant to form an aerated mass of catalyst flowing an aerated mass of such solids downwardly in a single substantially elongated confined path, the density of the mixture being sufficiently great whereby the pressure in the confined path increases in the direction of flow, discharging the aerated mass from the single confined path into an enlarged disengaging zone sealed from the confined path except at the point of discharge, flowing upwardly in the enlarged zone and into a separating zone a gas stream carrying suspended catalyst in low concentration, separating catalyst from the gas stream in the separating zone, and passing the separated catalyst directly from the separating zone into the said elongated confined path at a point in the path at which the pressure is lower than the pressure in the enlarged disengaging zone and also lower than the pressure under which the separated catalyst would exist just before entering said path.

3. In a method for effecting a chemical reaction in which a gaseous reactant is contacted with a finely divided solid catalyst, the steps comprising flowing said catalyst downwardly as an aerated dense mass in a single elongated confined path, the density of said aerated mass being such that pressure in the elongated confined path increases in the direction of flow of the mass, discharging the mass from the single elongated confined path into an enlarged catalyst contacting zone, introducing the gaseous reactant into said catalyst contacting zone, flowing from the catalyst contacting zone and into a separating zone a gas stream carrying suspended catalyst in low concentration, the rate at which catalyst is removed from said enlarged zone by said gas stream of low concentration being substantially lower than the rate at which catalyst is introduced into said enlarged zone from said single confined path, separating catalyst from the gas stream in the separating zone, and passing the separated catalyst directly from the separating zone into the elongated confined path at a point in the path at which the pressure is lower than the pressure in the contacting zone and also lower than the pressure under which the separated catalyst would exist just before entering said path.

4. A method for reacting carbon monoxide and hydrogen which comprises contacting a gaseous reaction mixture comprising carbon monoxide and hydrogen with a finely divided solid catalyst under suitable reaction conditions to produce normally liquid hydrocarbons and oxygenated compounds, forming a dense mixture of the catalyst and reaction products, flowing the dense mixture as a stream downwardly in a single substantially elongated confined path, the density of the mixture being relatively great whereby the pressure in the confined path increases in the direction of flow of the mixture, discharging the mixture from the single confined path into an enlarged catalyst disengaging zone sealed from the confined path except at the point of discharge, flowing from the enlarged zone and into a separating zone a gas stream carrying suspended catalyst in low concentration, separating catalyst from the gas stream in the separating zone, and passing the separated catalyst directly from the separating zone into the single elongated confined path at a point in the path at which the pressure is lower than the presure in the enlarged zone and also lower than the pressure under which the separated catalyst would exist just before entering said path.

5. In the treatment of a finely divided solid, the steps comprising flowing said finely divided solid as an aerated mass downwardly as a stream in a single substantially elongated confined path, the density of said aerated mass being sufficiently high whereby the pressure in the path increases in the direction of flow, discharging the aerated mass from the single confined path into an enlarged zone sealed from the confined path except at the point of discharge, introducing a gas into said enlarged zone, flowing from the enlarged zone and into a separating zone a gas stream carrying suspended finely divided solid material in low concentration, the rate at which solid material is removed from said enlarged zone by said gas stream of low concentration being substantially lower than the rate at which solid material is introduced into said enlarged zone from said single confined path, separating solid material from the gas stream in the separating zone, and passing the separated solid material directly from the separating zone into the said single elongated confined path at a point in the path at which the pressure is lower than the pressure in the enlarged zone and also lower than the pressure under which the separated catalyst would exist just before entering said path and further characterized such that the pressure under which the separated catalyst would exist just before entering the path is lower than the pressure in the enlarged zone.

6. In the treatment of finely divided solids and gases in which said solids flow downwardly as an aerated mass in a substantially elongated confined path and are discharged into an enlarged zone sealed from the confined path except at the point of discharge, in which a gas is introduced into said enlarged zone, and in which the gas flows out of said enlarged zone carrying suspended solids therein, the improvement which comprises flowing said gas containing suspended solids into a separating zone, the rate at which solids are removed from said enlarged zone by said gas stream of low concentration being substantially lower than the rate at which solids are introduced into said enlarged zone from said confined path, separating suspended solids from said gas in said separating zone, and passing the separated solids directly from the separating zone into the elongated confined path at a point in the path at which the pressure is lower than the pressure in the separating zone.

7. A hydrocarbon conversion process in which the hydrocarbon reactant is contacted with finely divided solid catalyst in a reaction zone in which the catalyst is maintained in suspension in the hydrocarbon reactant, and in which the finely divided catalyst is continuously circulated through the said reaction zone and a regeneration zone in which the catalyst is regenerated while being suspended in regenerating gas, the improvement which comprises flowing said finely divided catalyst as an aerated mass downwardly as a stream in a single substantially elongated confined path, the density of said aerated mass being sufficiently high whereby the pressure in the path increases in the direction of flow, discharging the aerated mass of catalyst from the single confined path into one of said reaction and regeneration zones, said zone being sealed from the single confined path except at the point of discharge, flowing from the zone in which said single confined path terminates a gas or vapor stream carrying suspended finely divided catalyst in low concentration, the rate at which catalyst is removed from the zone in which said confined path terminates by said gas or vapor stream of low concentration being substantially lower than the rate at which catalyst is introduced into said zone from said confined path, flowing said suspension into a separating zone separate from the reaction zones, separating suspended catalyst from the gas or vapor stream in the separating zone, and passing the separated solid catalyst directly from the separating zone into the said elongated confined path at a point at which the pressure is lower than the pressure in the zone in which said path terminates and also lower than the pressure under which the separated catalyst would exist just before entering said path.

8. In a hydrocarbon conversion process in which the hydrocarbon reactant vapor gas is contacted with a finely divided solid catalyst, an improvement which comprises flowing a suspension of said reactant and said finely divided solid catalyst downwardly as a stream in a single substantially elongated confined path, the density of the suspension being sufficiently high whereby the pressure in said path increases in the direction of flow, discharging the suspension of the catalyst and reactant from the single confined path into an enlarged disengaging zone, flowing from said enlarged disengaging zone a stream of reactant carrying suspended finely divided catalyst in low concentration, flowing said last mentioned suspension through a separating zone separate from the enlarged zone, separating suspended catalyst from the reactant stream in the separating zone, and passing the separated solid catalyst directly from the separating zone into said elongated confined path at a point in the path at which the pressure is lower than the pressure in the separating zone.

9. In the treatment of a finely divided solid, the steps comprising flowing said finely divided solid as an aerated mass downwardly in a single substantially elongated conduit, the density of said aerated mass in said conduit being sufficiently high whereby the pressure in said conduit increases in the downward direction of flow, discharging the aerated mass from the single conduit into an enlarged zone, introducing a gas into said enlarged zone, flowing from the enlarged zone and into a centrifugal separator a gas stream carrying suspended finely divided solid material in low concentration, the rate at which solid material is removed from said enlarged zone by said gas stream of low concentration being substantially lower than the rate at which solid material is introduced into said enlarged zone from the single conduit, separating solid material from the gas stream in the centrifugal separator, and passing the separated solid material directly from the centrifugal separator into said conduit at a point in said conduit at which the pressure is lower than the pressure in the centrifugal separator and the pressure under which the separated solid material would exist just before entering said conduit is less than the pressure in the enlarged zone.

JOSEPH W. JEWELL.

References Cited in the file of this patent

UNITED STATES PATENTS

| Number | Name | Date |
|---|---|---|
| 2,256,969 | Barr | Sept. 23, 1941 |
| 2,405,395 | Bahlke et al. | Aug. 6, 1946 |
| 2,409,707 | Roetheli | Oct. 22, 1946 |
| 2,420,558 | Munday | May 13, 1947 |
| 2,433,726 | Angell | Dec. 30, 1947 |
| 2,451,924 | Crowley, Jr. | Oct. 19, 1948 |
| 2,481,089 | Dickinson | Sept. 6, 1949 |